(12) United States Patent
Guerreiro et al.

(10) Patent No.: US 11,407,454 B2
(45) Date of Patent: Aug. 9, 2022

(54) COMPOSITE VEHICLE CROSSMEMBER

(71) Applicant: Faurecia Interior Systems, Inc., Auburn Hills, MI (US)

(72) Inventors: Pierre Guerreiro, Margency (FR); Mickael Trannoy, Cauvigny (FR); Guillaume Lemaire, Melbourne (AU); Stephen Lesobre, Henonville (FR); Yicheng Du, Auburn Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 130 days.

(21) Appl. No.: 16/416,823

(22) Filed: May 20, 2019

(65) Prior Publication Data

US 2020/0369327 A1    Nov. 26, 2020

(51) Int. Cl.
*B62D 29/04*      (2006.01)
*B62D 25/14*      (2006.01)
*B29D 99/00*      (2010.01)
*B29K 101/12*     (2006.01)
*B29K 307/04*     (2006.01)
(Continued)

(52) U.S. Cl.
CPC ....... *B62D 29/043* (2013.01); *B29D 99/0003* (2013.01); *B62D 25/145* (2013.01); *B29C 45/14786* (2013.01); *B29C 70/081* (2013.01); *B29C 70/085* (2013.01); *B29C 70/30* (2013.01); *B29C 70/304* (2021.05); *B29C 70/54* (2013.01); *B29C 70/887* (2013.01); *B29K 2101/12* (2013.01); *B29K 2307/04* (2013.01); *B29L 2031/3005* (2013.01); *B29L 2031/3008* (2013.01); *B62D 29/04* (2013.01)

(58) Field of Classification Search
CPC .... B62D 29/043; B62D 25/145; B62D 29/04; B29D 99/0003; B29K 2101/12; B29K 2307/04; B29C 70/304; B29C 70/085; B29C 70/887; B29C 70/081; B29C 45/14786; B29C 70/30; B29C 70/54; B29L 2031/3005; B29L 2031/3008
USPC ................................ 296/193.02, 193.01, 70
See application file for complete search history.

(56) References Cited

U.S. PATENT DOCUMENTS 6,893,733 B2    5/2005  Obeshaw
6,921,127 B2 *  7/2005  Feith .................. B60H 1/00564
                                            296/193.02
(Continued)

FOREIGN PATENT DOCUMENTS

DE    102011119226 A1    5/2013
FR      2994681 A1       2/2014

OTHER PUBLICATIONS

European Search Report corresponding to European Application No. 20175163.3, dated Sep. 17, 2020, 7 pages.

*Primary Examiner* — D Glenn Dayoan
*Assistant Examiner* — Dana D Ivey
(74) *Attorney, Agent, or Firm* — Reising Ethington P.C.

(57) ABSTRACT

A vehicle crossmember is made from continuous fiber-reinforced polymeric material without the need for metallic structural reinforcements. The crossmember includes more than one fiber-reinforced material composition, including different amounts and/or types of fiber reinforcements along different lengthwise portions of a crossbar of the crossmember. Attachment points and stiffening ribs can be overmolded onto surfaces of the crossbar before assembling two halves of the crossbar together to form the crossmember.

20 Claims, 6 Drawing Sheets

(51) Int. Cl.
    *B29C 70/08*                (2006.01)
    *B29L 31/30*                (2006.01)
    *B29C 70/88*                (2006.01)
    *B29C 70/54*                (2006.01)
    *B29C 70/30*                (2006.01)
    *B29C 45/14*                (2006.01)

(56) References Cited

U.S. PATENT DOCUMENTS

| | | | |
|---|---|---|---|
| 8,950,802 B2 | 2/2015 | Hasl | |
| 9,365,244 B2 | 6/2016 | Appasamy et al. | |
| 9,493,192 B2 * | 11/2016 | Baudard | B62D 25/145 |
| 2007/0132280 A1 | 6/2007 | Wolf | |
| 2014/0103685 A1 * | 4/2014 | Mani | B62D 25/145 |
| | | | 296/193.02 |
| 2014/0319879 A1 * | 10/2014 | Reese | B29C 70/32 |
| | | | 296/193.02 |
| 2015/0151793 A1 * | 6/2015 | Appasamy | B62D 25/145 |
| | | | 296/72 |

\* cited by examiner

COMPOSITE VEHICLE CROSSMEMBER

TECHNICAL FIELD

The present disclosure is related generally to structural members for vehicles and, more particularly, to structural crossmembers that extend transversely across the vehicle.

BACKGROUND

Plastics and other polymeric materials have gradually replaced metallic materials in various vehicle components over the past several decades. Such polymer-based materials often offer weight or cost savings when replacing traditionally metal parts. One area that has long continued to employ mainly metallic materials in vehicle construction, however, is structural components. Polymer-based materials typically do not possess the strength or stiffness necessary in such applications. While attempts have been made to partly replace metal materials in such applications, the result has been only partial replacement of metals in hybrid-type structures employing a combination of metal and plastic.

In one example, U.S. Pat. No. 8,950,802 to Hasl proposes a structural part for a motor vehicle including an injection molded shell-type structure with reinforcing ribs molded in the hollow part of the shell. But the molded part is not structurally sufficient on its own and requires steel rods molded into the plastic to arrive at a structural part with sufficient strength and stiffness for use in a vehicle.

SUMMARY

An illustrative vehicle crossmember is configured for attachment to transversely opposite sides of a vehicle body and includes a crossbar extending in a lengthwise direction such that the crossbar extends transversely across the vehicle body when attached to the vehicle body. The crossbar is made from fiber-reinforced polymeric material having a plurality of different material compositions along the lengthwise direction.

In various embodiments, the plurality of different material compositions includes a first material composition and a second material composition that meet at a transition region of the crossbar. The first material composition is uniform along a first portion of the crossbar between a first mounting flange and the transition region, and the second material composition is uniform along a second portion of the crossbar between a second mounting flange and the transition region.

In various embodiments, the first mounting flange includes the first material composition and the second mounting flange includes the second material composition.

In various embodiments, each portion of the crossbar includes lengthwise continuous fiber reinforcements each having an end at the transition region.

In various embodiments, one of the plurality of different material compositions includes carbon fiber reinforcements and another of the plurality different material compositions is substantially free from carbon fiber reinforcements.

In various embodiments, each one of the plurality of different material compositions includes a polymer portion and a fiber portion, the polymer portion being the same among the plurality of different material compositions, and the fiber portion being different among the plurality of different material compositions.

In various embodiments, the crossbar is tubular and extends between first and second mounting flanges along a central axis such that the fiber-reinforced polymeric material is radially spaced from the central axis between the mounting flanges.

In various embodiments, the crossbar is formed from two contoured sections with concave sides of the contoured sections facing each other. The contoured sections are attached together along a pair of joints extending along the lengthwise direction.

In various embodiments, the crossmember includes an overmolding extending along inside and outside surfaces of the crossbar. The overmolding includes stiffening ribs and attachment features. The attachment features are located and configured to affix the crossmember to the vehicle body.

In various embodiments, the attachment features are located along first and second mounting flanges.

In various embodiments, the overmolding includes a center leg extending away from the crossbar to an end including one of the attachment features.

In various embodiments, the crossbar is tubular and at least some of the stiffening ribs are located inside the tubular crossbar.

In various embodiments, the crossmember includes a joint formed along the outside surface of the crossbar. The joint is formed from overmolding material and joins one contoured section of the crossbar to another contoured section of the crossbar.

In various embodiments, the overmolding at least partly covers a transition region of the crossbar where two of the plurality of different material compositions meet.

Various embodiments of a method of making a vehicle crossmember having opposite ends configured for attachment to opposite sides of a vehicle body include the steps of forming a first contoured section of a crossbar from multiple layers of fiber-reinforced polymeric sheet material, forming a second contoured section of a crossbar from multiple layers of fiber-reinforced polymeric sheet material, overmolding stiffening ribs or vehicle body attachment points along surfaces of the first and second contoured sections, and attaching the overmolded first and second contoured sections together to form the vehicle crossmember. One end of the first contoured section has a different number of layers or a different type of reinforcement fibers than an opposite end of the first contoured section, and the contoured sections form the crossbar in tubular form with at least some of the stiffening ribs inside the crossbar.

It is contemplated than any of the above-listed features can be combined with any other feature or features of the above-described embodiments or the features described below and/or depicted in the drawings, except where there is an incompatibility of features.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle crossmember made from fiber-reinforced polymeric material without the need for metallic structural reinforcements. The crossmember includes more than one fiber-reinforced material composition, including different amounts and/or types of fiber reinforcements along different lengthwise portions of the crossmember. In this manner, strength and/or rigidity can be tailored along the length of the crossmember so that higher performance material compositions are efficiently employed only where they are most needed.

Figure 1:
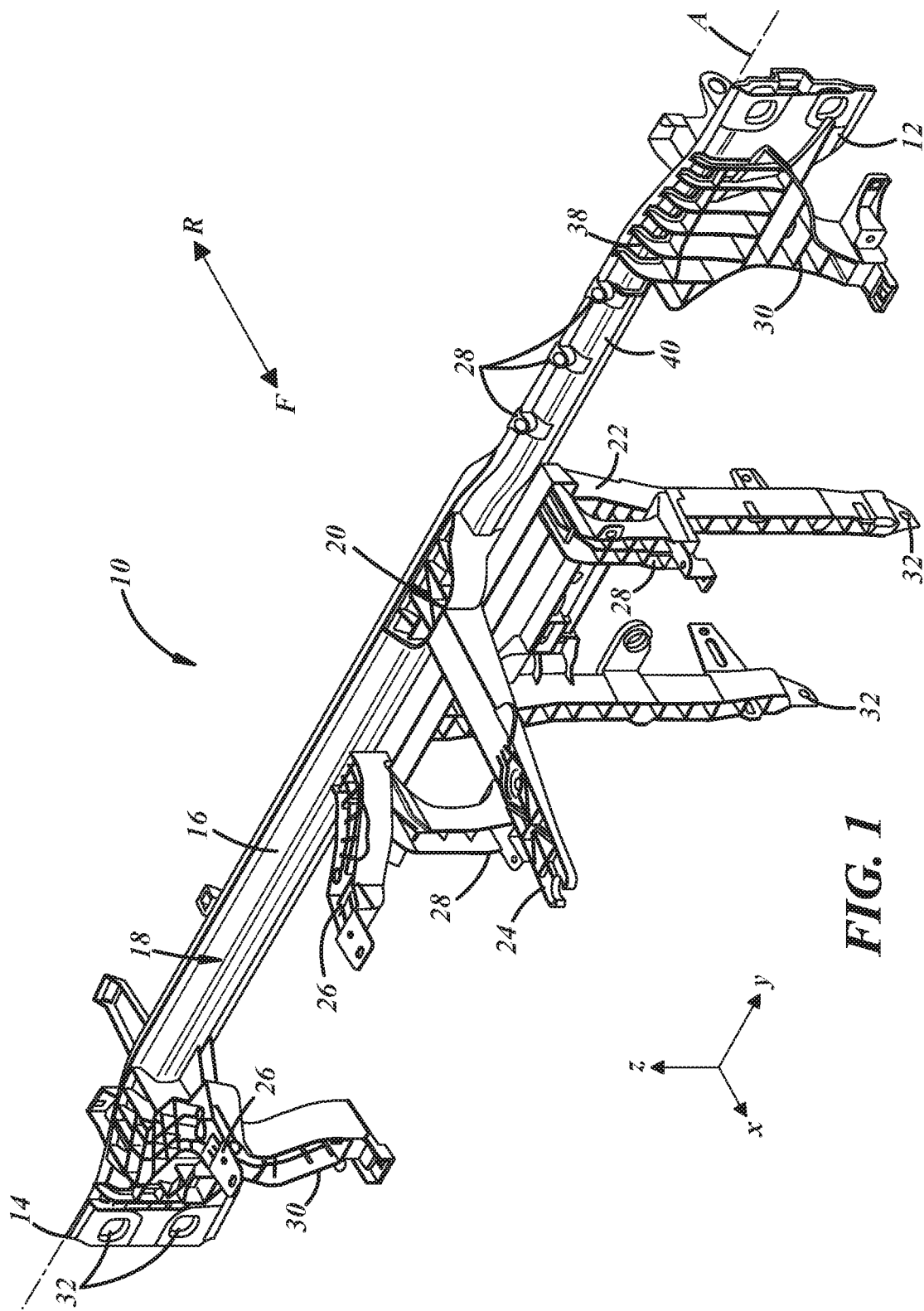
FIG. 1 is a perspective view of an embodiment of a composite vehicle crossmember.

FIG. 1 is a perspective view of an exemplary vehicle crossmember 10 including a first mounting flange 12, a second mounting flange 14, and a crossbar 16 extending in a lengthwise direction between the mounting flanges. The illustrated crossmember 10 is of the type used at the forward end of a vehicle passenger cabin extending between A-pillars of the vehicle body and concealed from view in the cabin by a dashboard or instrument panel. These teachings are applicable to crossmembers located elsewhere along the vehicle body. The first mounting flange 12 is configured for attachment to one side (e.g., the driver side) of the vehicle body, and the second mounting flange 14 is configured for attachment to an opposite side (e.g., the passenger side) of the vehicle body so that the crossmember 10 extends transversely across the vehicle body when attached thereto. The crossbar 16 is made from fiber-reinforced polymeric material having a plurality of different material compositions along the lengthwise direction as discussed further below.

FIG. 1 includes annotations indicating the forward (F) and rearward (R) directions of the vehicle in which the crossmember 10 is installed. These directions are aligned with the x-direction of FIG. 1, also referred to as the longitudinal direction of the vehicle. The transverse or side-to-side direction of the vehicle is aligned with the y-direction of FIG. 1, and the z-direction is vertical. These are all directions with respect to the vehicle, and the crossmember 10 may have its own reference frame. For example, as used herein, the lengthwise direction is the direction the crossbar 16 extends between mounting flanges 12, 14 and may be defined by a central axis A of the crossbar, which is not necessarily straight. Other directions may be defined with respect to the central axis A, such as a radial direction, extending away from and perpendicular with the central axis, and a circumferential direction around the central axis.

The illustrated crossmember 10 is generally constructed as two main components, including a structural beam 18 and an overmolding 20, each made from different types of materials. The structural beam 18 is made from fiber-reinforced polymeric material in which the fiber reinforcements are non-randomly oriented and have fiber lengths too long to be injection molded with a polymer in pellet form, while the overmolding 20 is made from a thermoplastic injection molding compound and can thus include more intricately shaped features. The structural beam 18 includes the crossbar 16 and forms a portion of each mounting flange 12, 14 at opposite ends of the crossbar. The overmolding 20 includes one or more brackets 22-30 and attachment features 32. The brackets 22-30 extend away from the structural beam 18 to interface with the vehicle body and/or to support other vehicle components with respect to the vehicle body. Each attachment feature 32 is configured to attach a portion of the crossmember 10 to the vehicle body or to attach a portion of another vehicle component to the crossmember.

The illustrated brackets include a center leg bracket 22, a central cowl bracket 24, passenger airbag brackets 26, lower/knee airbag brackets 28, and left and right calipers 30. The attachment features 32 labeled in FIG. 1 include a pair of vertically spaced attachment features 32 at each mounting flange 12, 14 and a pair of horizontally spaced attachment features 32 at respective ends of legs of the center leg bracket 22. These attachment features 32 are of the type configured to affix the crossmember to the vehicle body, with the attachment features of the mounting flanges 12, 14 configured to attach the mounting flanges to respective opposite transverse sides of the vehicle body and the attachment features of the center leg bracket 22 configured to attach the leg bracket to a bottom or floor of the vehicle body.

Figure 2:
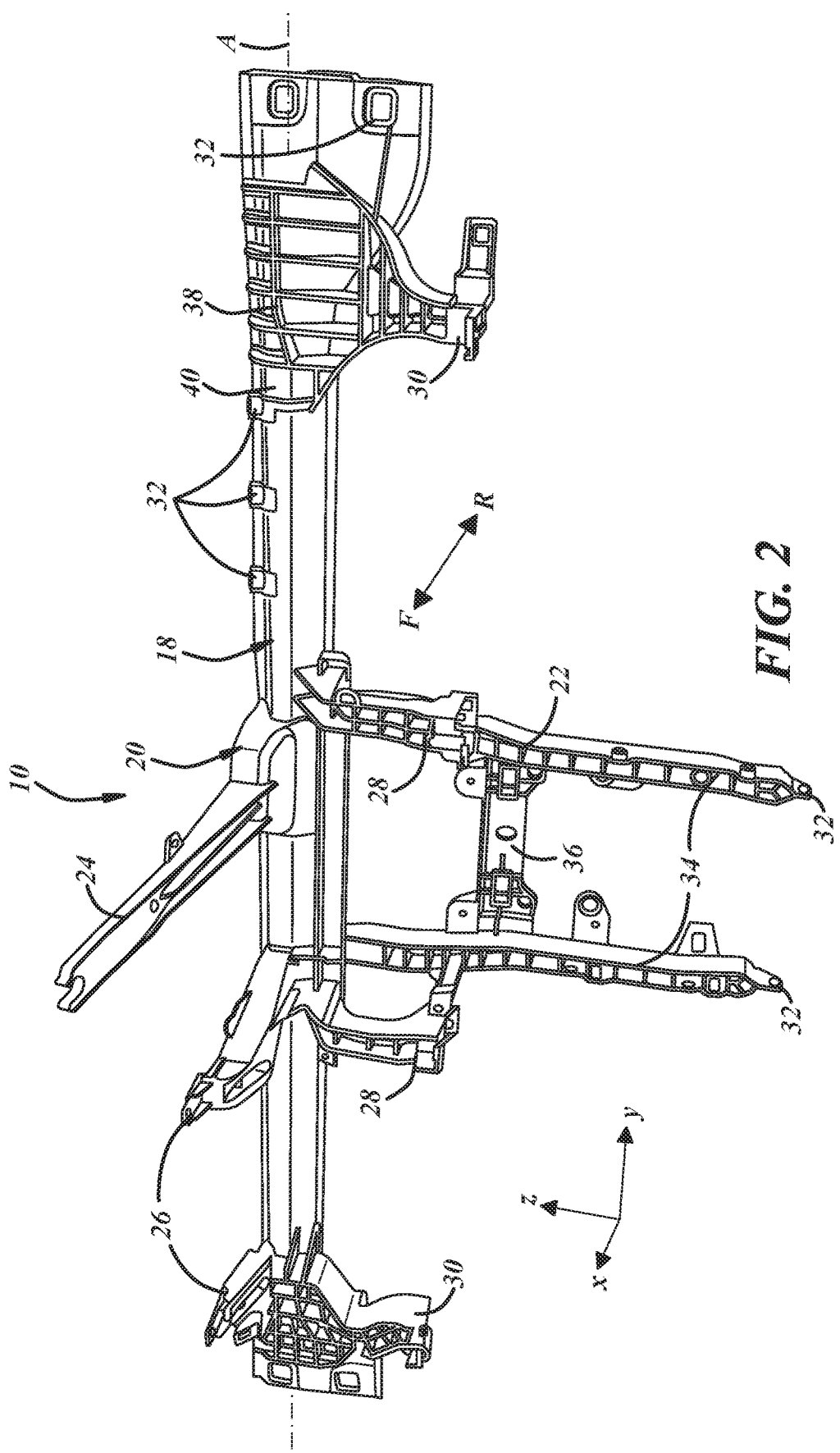
FIG. 2 is another perspective view of the crossmember of FIG. 1.

FIG. 2 is an additional view from the front and bottom side of the crossmember 10 of FIG. 1 showing the brackets from another perspective for clarity. The center leg bracket 22 extends vertically downward from the structural beam 18 and includes a pair of legs 34 horizontally spaced by a brace 36 with the vehicle body attachment features 32 at the ends of the legs 34. The cowl bracket 24 and the passenger airbag brackets 26 extend horizontally forward from the top of the structural beam 18, the knee airbag brackets 28 extend vertically downward from the bottom of the structural beam, and the calipers 30 each extend vertically downward from the structural beam. The calipers 30 may serve as support brackets for multiple components. For example, the passenger side caliper 30 and/or knee airbag bracket may interface with and include an attachment feature for both a glove box.

Each of the brackets 22-30 may include one or more attachment features 32, but not all of the attachment features are labeled in FIGS. 1 and 2. For example, the center leg bracket 22 may include attachment features for an HVAC component, a vehicle audio system, or a navigation system. Each attachment feature 32 may be in the form of an aperture, slot, or notch that accommodates a fastener (e.g., a screw or snap-feature), or each attachment feature may be in the form of a fastener that interfaces with a complimentary feature on the component or vehicle body portion to be attached. The crossmember 10 may further include a metal insert or clip at each attachment feature 32 to accommodate a fastener or other complimentary attachment feature. Such metal inserts or clips may be insert molded and embedded in the overmolding 20 at the attachment features 32 and configured to bear clamp loads associated with attachment of the crossmember 10 to the vehicle body or other components. These metal inserts and/or clips may be the only metal components of the vehicle crossmember 10 with none of the structural components of the crossmember being formed from metal—which is to say that there is no continuous metal component extending between opposite sides of the vehicle or extending between the vehicle floor and a side of the vehicle.

Some attachment features 32 may not be associated with brackets extending away from the structural beam 18, such as the attachment features of the mounting flanges 12, 14. In the illustrated example, the overmolding 20 includes attachment features 32 along the top of the crossmember 10 for mounting a steering column support between the first mounting flange 12 and the center leg bracket 22. These particular attachment features 32 are not associated with brackets extending away from the structural beam 18 and may be in the form of bosses with metal inserts for attachment of the steering column support. The portion of the crossmember 10 at which the steering column will be located may be considered a high-load region of the crossmember, and the associated attachment features 32 are located relatively close to the structural beam 18 of the crossmember.

The overmolding 20 of the crossmember 10 may further include stiffening ribs 38. As illustrated in FIGS. 1 and 2, these ribs 38 may be overmolded along an outside surface 40 of the beam 18 and/or as part of the brackets 22-30 of the overmolding 20. As discussed further below, the crossmember 10 and, in particular, the overmolding 20, may include stiffening ribs located inside the structural beam 18, including within the crossbar 16.

In a particular embodiment according to the method described below, neither the structural beam 18 nor the overmolding 20 is ever a stand-alone component during construction of the crossbeam 10. Rather, each of these components 18, 20 is made from more than one portion and formed when those portions come together to form the crossmember 10 of which they are ultimately a part.

Figure 3:
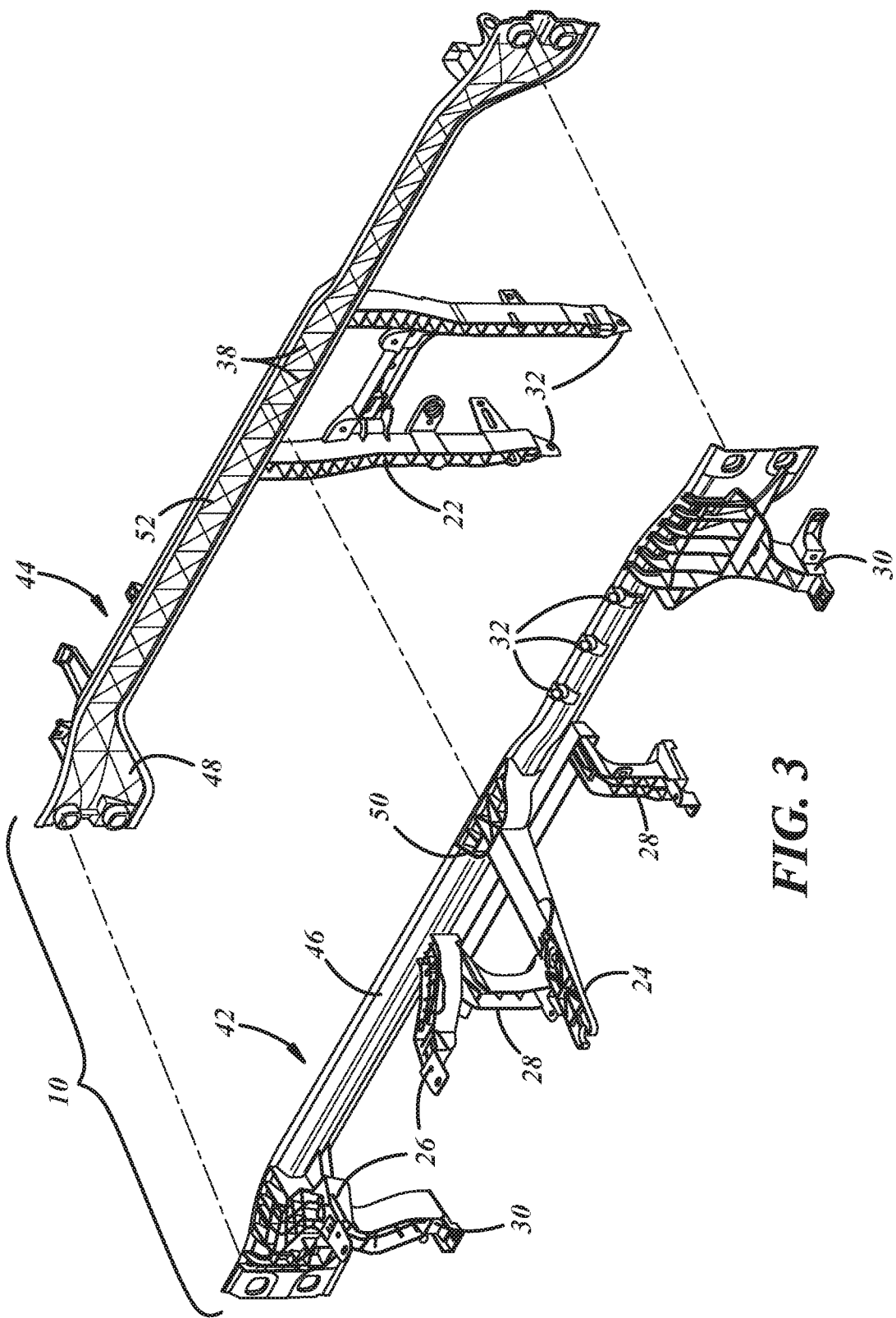
FIG. 3 is an exploded view of the crossmember of FIG. 1, illustrating front and rear portions of the crossmember.

FIG. 3 is an exploded view of the crossbeam 10 of FIGS. 1 and 2 illustrating first and second portions 42, 44 that form the crossmember 10 when joined together. In this example, these portions represent respective front and rear portions 42, 44 of the crossmember 10. The illustrated front portion 42 includes the cowl bracket 24, the passenger airbag brackets 26, the knee airbag brackets 28, the calipers 30, and the steering column support attachment features 32, while the rear portion 44 includes the center leg bracket 22 and its associated attachment features 32. The structural beam 18 is thus formed in two pieces, including a first contoured section 46 and a second contoured section 48. The overmolding 20 is also formed in two pieces, including a first overmolded portion 50 on the first contoured section 46 and a second overmolded portion 52 on the second contoured section 48. In this manner, it is possible to form a tubular crossbar 16 and structural beam 18 with stiffening ribs 38 affixed along the inside of the beam and crossbar.

Figure 4:
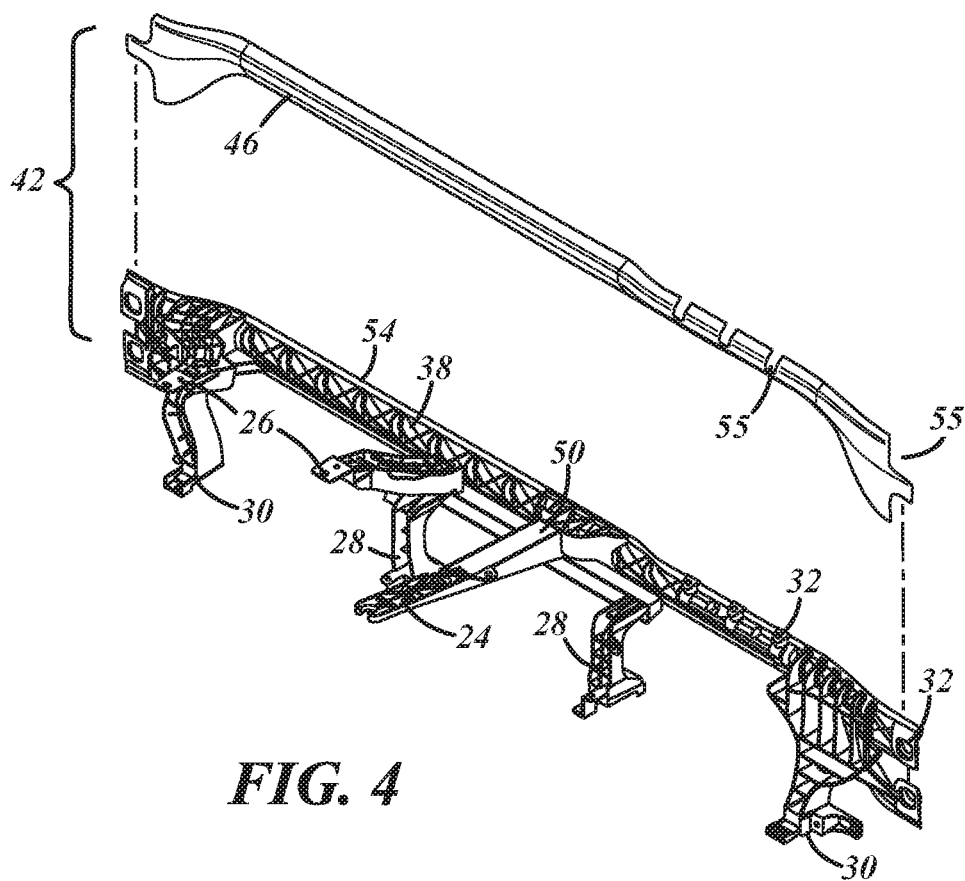
FIG. 4 is an exploded view of the front portion of the crossmember of FIG. 3, including a contoured section and an overmolded portion.

FIG. 4 is an exploded view of the front portion 42 of the crossmember 10 of FIG. 3, separately showing the first or front contoured section 46 of the structural beam 18 and the first or front portion 50 of the overmolding 20. It should be understood that this exploded view is merely a representation of the two components 46, 50 of the front portion 42 of the crossmember and that these components, made from different materials as noted above, are not actually separable once the overmolded portion 50 is molded onto surfaces of the contoured section 46 of beam. In fact, the contoured section 46 may be entrapped or at least partly encapsulated by the material of the overmolded portion 50. For example, the illustrated overmolded portion 50 includes lengthwise flanges 54 extending along top and bottom edges of the contoured section 46, and these flanges may be part of one monolithic piece of overmolding material that includes the stiffening ribs 38, located along an inside surface of the contoured section, and the brackets 24-30, located along an outside surface of the contoured section. In other words, the illustrated overmolded portion 50 is one continuous piece of thermoplastic injection molded material that circumscribes the contoured section 46 with thermoplastic material along inside and outside surfaces and connecting edges of the contoured section 46. The illustrated contoured section 46 also includes cutouts 55 aligned and co-located with attachment features 32 of the mounting flanges and attachment features 32 for the steering column support.

In a manner of forming the illustrated portion 42 of the crossmember, the contoured section 46 of the structural beam is first formed into the desired shaped from fiber-reinforced polymeric material. The formed contoured section 46 is then placed in an injection mold and supported within a cavity of the mold that is shaped to form the overmolded portion 50 along surfaces of the contoured section. Any metal inserts necessary at attachment features of the overmolded portion 50 are also supported at the necessary locations within the mold cavity. The mold cavity is then filled with the thermoplastic molding compound to form the overmolded portion 50 around the contoured section 46 and to at least partly encapsulate the metal inserts.

The overmolding material may be any suitable thermoplastic injection molding compound. Due to the structural nature of the crossbeam 10 of which the overmolding 20 is a part, a relatively stiff thermoplastic material may be preferred for the overmolding, such as a reinforced thermoplastic material that includes a polymer portion and a reinforcement portion. The polymer portion may be any suitable thermoplastic, such as an engineering grade resin. Suitable examples include polyamides (PA6, PA6,6, PA6/6,6 copolymers or alloys), PC/ABS alloys, and certain polyolefins (e.g., TPO), polyesters (PET or PBT). Other examples of thermoplastic materials include, but are not limited to PEK, PEEK, PPS, PA 11/12, PA4,6, PPA, SPS, TPE, POM, PP, HDPE, LDPE, LLDPE, PAI, PPSU, PSU, PES, PC, PC/PET, PPE, PMMA, SAN, ABS, HIPS, PS, PVC, and various possible alloys, blends and copolymers thereof. The reinforcement portion may include non-polymeric materials such as mineral or glass fibers, to name a few examples. The reinforcements should be sized sufficiently small for purposes of injection molding. In one particular example, the overmolding material is glass fiber-reinforced polyamide where the glass fiber is present in an amount between 25 wt % and 75 wt %. In another particular example, the overmolding material is glass fiber-reinforced polyamide where the glass fiber is present in an amount greater than 50 wt %. In another particular example, the overmolding material is PA6 reinforced with 60 wt % glass fibers. The overmolded portion 50 may vary in thickness between 1.0 and 5.0 mm. In a particular example, the overmolded portion 50 has a nominal thickness of about 2.5 mm that varies between about 1.5 mm and 4.5 mm. These dimensional ranges and material types are of course non-limiting.

Figure 5:
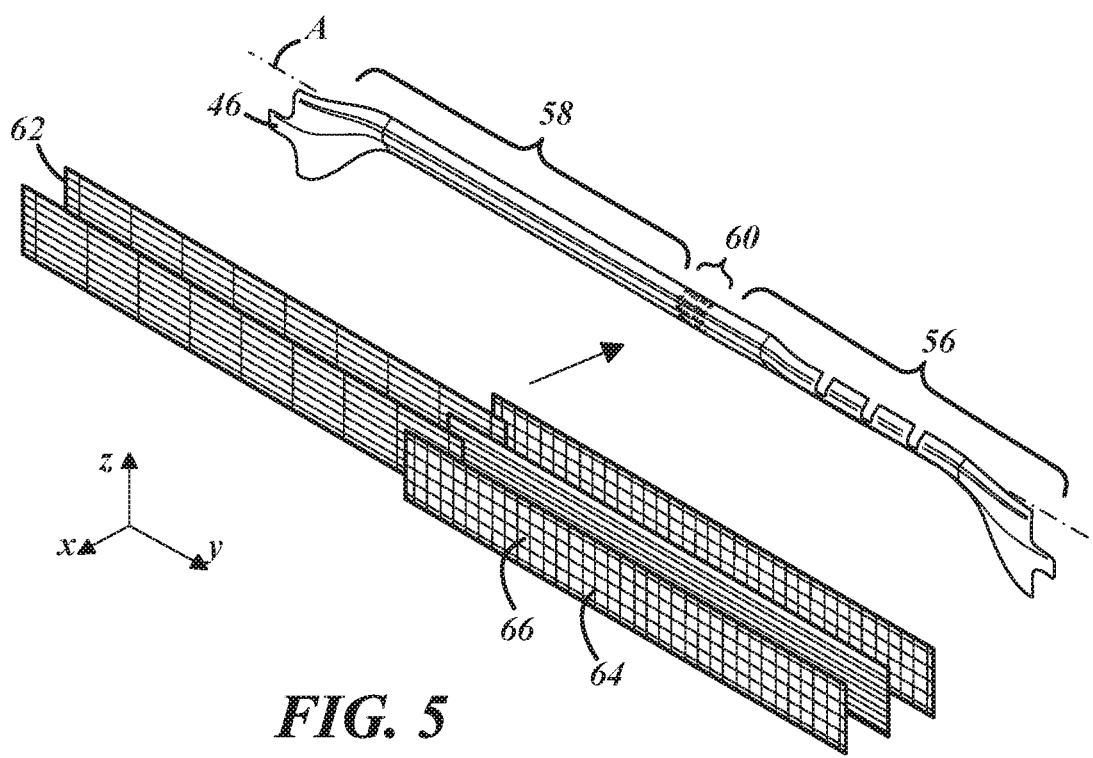
FIG. 5 illustrates sheet materials from which the contoured section of FIG. 4 can be formed.

As noted above, the structural beam 18 and, therefore, the contoured section 46 of the beam, is made from fiber-reinforced polymeric material in which the fiber reinforcements are too long for use in injection molding. As also noted above, the fiber-reinforced polymeric material has a plurality of different material compositions along the lengthwise direction. FIG. 5 illustrates the contoured section 46 and a manner in which the material composition can be made different at different lengthwise locations therealong.

In the illustrated example, the contoured section 46 includes a first portion 56, a second portion 58, and a transition region 60. The first portion 56 extends from one end of the contoured section 46 to the transition region 60 and has a first uniform material composition. The second portion 58 extends from an opposite end of the contoured section 46 to the transition region 60 and has a second uniform material composition. The transition region 60 has a third material composition that is a combination of the first and second material compositions. In this case, the transition region 60 has a material composition that is 60% of that of the first portion 56 and 40% of that of the second portion 58.

In this example, each of the three material compositions is formed as a multi-layer composition including non-randomly oriented fiber reinforcements. In particular, the first material composition is formed as a tri-layer composition, the second material composition is formed as a bi-layer composition, and the transition region is formed as a 5-layer composition. The illustrated multi-layer compositions are formed from multiple sheets 62 of continuous fiber-reinforced material including continuous reinforcing fibers 64 embedded in a polymeric matrix material 66. Although only one set of fiber reinforcements 64 and polymeric matrix material 66 are annotated in FIG. 5, one or both of those components of the sheets 62 of material may be the same or different among the different sheets. As used herein, a "different" material composition along the lengthwise direction of the contoured section 46, the crossbar 16, or the beam 18 means that one lengthwise portion has at least one of the following that is different from another lengthwise portion: the chemical composition of the polymeric matrix material, the chemical composition of the fibers, the average orientation of the fibers, the orientation of fibers relative to an adjacent layer, the diameter of the fibers, the proportion of fibers to polymer matrix, the number of layers used to form the portion, and the thickness of the layers used to form the portion.

In the illustrated example, the first portion 56 is formed from three sheets 62 of continuous fiber-reinforced (CFR) material. The center one of the three sheets includes fibers 64 oriented in only a single direction—i.e., in the lengthwise or y-direction. Such a sheet of material may be referred to as unidirectional (or UD) tape. The UD tape is sandwiched between two sheets each having fibers in both the lengthwise direction (y) and in a direction (z) perpendicular to the lengthwise direction. The resulting first portion 56 of the contoured section 46 thus has both lengthwise and circumferentially oriented fibers, with a portion of the finished thickness having only lengthwise fibers. The second portion 58 of the illustrated contoured section 46 is formed from two sheets 62 of material, both of which include fibers oriented in two perpendicular directions (y and z), resulting in the second portion of the contoured section 46 having both lengthwise and circumferentially oriented fibers.

In one manner of making the contoured section 46, the sheets 62 are stacked as shown between opposite parts of a forming or molding die, with ends of the sheets in an alternating overlapping arrangement at what will become the transition region 60. The sheets 62 are either pre-heated, or the forming die is heated, and the forming die is closed to form the sheets to the desired shape. The formed material is then cooled and removed from the die. The die may also be configured to cut or trim the material to define the edges of the contoured section 46, including any cutouts 55, or an additional trimming operation can be performed after molding. Multiple layers of continuous sheet stock could alternatively be fed and indexed through a forming tool with the tool opening and closing to form and trim the individual contoured sections. It is also contemplated that other processes could be used to achieve the same multi-material composition contoured section 46 or structural beam 18. For example, fiber tows could be laid between molding die parts in the desired orientations and clamped in a cavity with a polymer or polymer precursor then introduced in the cavity to impregnate the fibers.

In various embodiments, the polymeric matrix material 66 of each of the layers of sheet material 62 is compatible or miscible with adjacent layers for a given portion of the contoured section 46. For example, the first portion 56 may be made from sheets 62 of material in which the polymer matrix is from the same polymer family (e.g., polyamide, polyolefin, polyester, etc.). In some embodiments, all of the sheets 62 that form a given portion of the contoured section 46 have the same polymer matrix material, such as PA6 or PA6,6. In some embodiments, the same holds true for sheets of material that only partially overlap, such as in the transition region 60. For example, all five sheets of material in the illustrated example may have a polymeric matrix material that is compatible with or the same as adjacent and overlapping sheets.

As noted above, the portion of the crossbeam configured to support a steering system of the vehicle, such as the first portion 56 of FIG. 5, may be considered a high-load region of the crossbeam. It may therefore be desirable that the material composition of the first portion 56 is superior to that of the material composition of the second portion 58 in some respect. For example, the first portion 56 may have a higher strength, a higher stiffness, have a higher strength-to-weight ratio, or be made from more material layers than the second portion. One manner of achieving a higher performance material composition at the desired lengthwise portion of the crossbeam is to include a different type of fibers 64 at that portion. For instance, carbon or aramid fiber reinforcements may be included in the material composition of the first portion 56 while glass fiber reinforcements are included in the material composition of the second portion 56. Carbon, aramid, or other high-performance fibers may be stronger and lighter than glass fibers, resulting in a higher performance material composition wherever used. In this manner, the more expensive high-performance fibers can be selectively and efficiently employed only where needed (e.g., along the steering column support region of the crossmember) and less expensive fibers can be used in less critical areas.

In one example, one or more of the sheets 62 of material used to make the first portion 56 of the illustrated contoured section 46 includes carbon fibers, aramid fibers, or other non-glass and non-metallic fibers. In a particular example, these high-performance fibers are included in at least a center layer of the material composition of the first portion 56. In another particular example, at least the center layer of the material composition of the first portion includes unidirectional fibers with the fibers oriented in the lengthwise direction.

Each sheet 62 of material may have the same or different fiber content (i.e., proportion of fiber to polymer) and may have the same or different proportions of fibers oriented in specific directions. In the example of FIG. 5, 100% of the fibers are oriented in the lengthwise (y) direction in the center sheet of material of the first portion 56, while the adjacent sheets of the first portion 56 have approximately 50% of the fibers oriented lengthwise (y) and 50% of the fibers oriented perpendicular (z) to lengthwise. Also in the example of FIG. 5, approximately 80% of the fibers are oriented lengthwise (y), while approximately 20% of the fibers are oriented perpendicular (z) to lengthwise in both layers of the second portion 58. There is no limitation to the proportions of fibers in each direction. Any percentage of the fibers from 0 to 100 may be oriented in a single direction in any particular sheet, and the number of orientation directions can be higher than two, such as three (45 degrees, −45 degrees, 0 degrees with respect to lengthwise) or four (45, −45, 0 and 90 degrees) directions or more.

Each portion of the contoured section 46 and the resulting crossbar 16 and beam 18 may have a fiber content in a range from 25% to 80% by volume. Preferably, the fiber content may be in a range between 35% and 70% by volume. More preferably, the fiber content may be in a range between 45% and 60% by volume.

In one non-limiting embodiment, the first portion 56 of the contoured section 46 has a material composition formed as a tri-layer composition, including a central layer between two outer layers. In this tri-layer composition, the polymer matrix 66 is the same in all three layers, such as polyamide 6. In this embodiment, the central layer includes only unidirectional carbon fibers oriented in the lengthwise direction, and the carbon fiber content is between 45% and 50% by volume. Each of the two outer layers includes only glass fibers at a content of 50% by volume, with 50% of those glass fibers oriented lengthwise (y) and 50% oriented perpendicular (z) to lengthwise. In this embodiment, the second portion 58 of the contoured section 46 has a material composition formed as a bi-layer composition in which the polymer matrix 66 is the same in both layers and the same as in the layers of the first portion 56. Each layer of the second portion is substantially free of carbon fibers and includes only glass fibers at a fiber content between 55% and 60% by volume, with 80% of the fibers oriented lengthwise (y) and 20% oriented perpendicular (z) to lengthwise.

Figure 6:
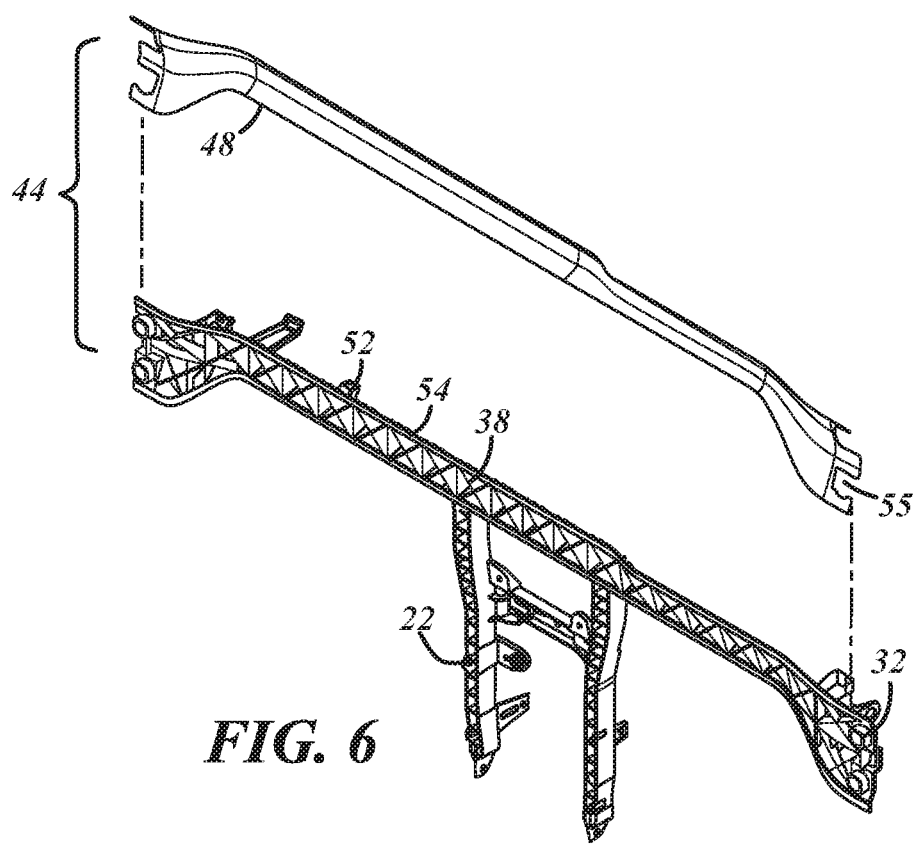
FIG. 6 is an exploded view of the rear portion of the crossmember of FIG. 3, including a contoured section and an overmolded portion.
Figure 7:
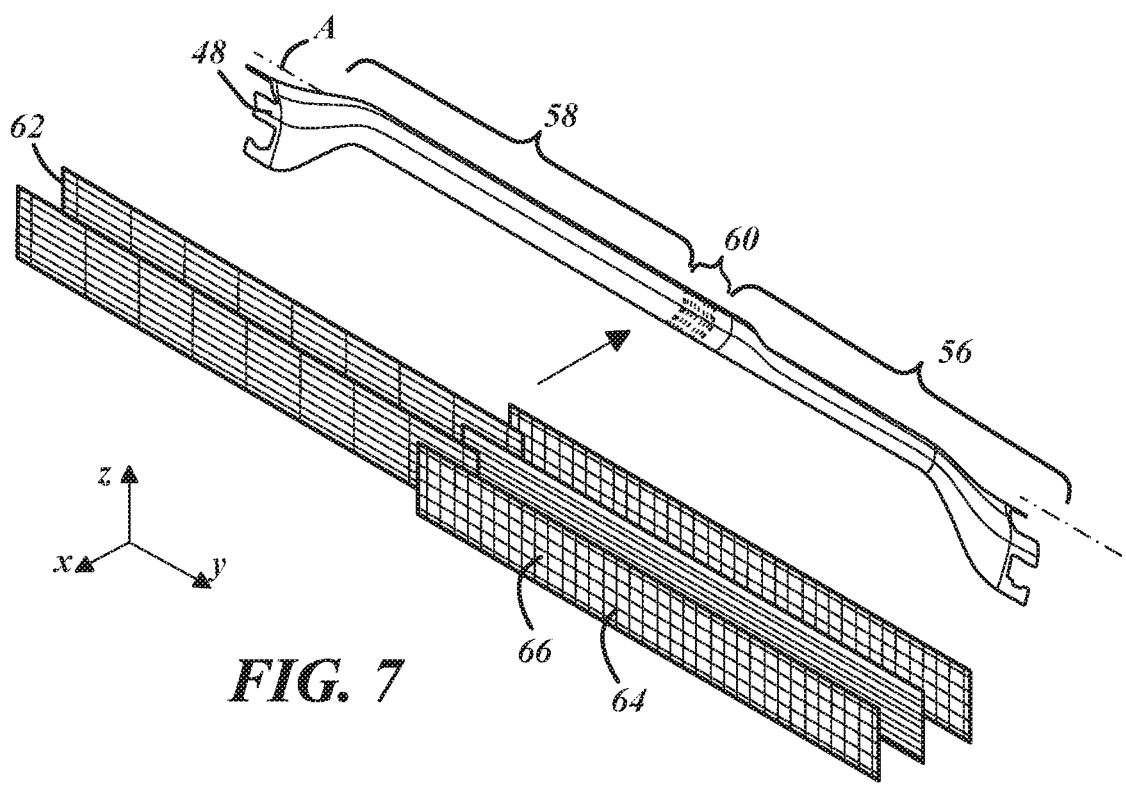
FIG. 7 illustrates sheet materials from which the contoured section of FIG. 6 can be formed.

FIGS. 6 and 7 are substantially similar to FIGS. 4 and 5 except that they pertain to the second or rear portion 44 of the crossbeam 10 of FIG. 3 and to the respective contoured portion 48 and overmolded portion 52 of the rear portion of the crossbeam. Much of the description associated with FIGS. 4 and 5 applies equally to FIGS. 6 and 7 and is therefore not repeated in full.

FIG. 6 is an exploded view of the rear portion 44 of the crossmember 10 of FIG. 3, separately showing the second or rear contoured section 48 of the structural beam 18 and the second or rear portion 52 of the overmolding 20. This view is merely a representation of the two components 48, 52, which are made from different materials and not actually separable once the overmolded portion 52 is molded. The contoured section 48 may be entrapped or at least partly encapsulated by the overmolded portion 52 as described above in conjunction with FIG. 4. The overmolded portion 52 includes flanges 54 extending along edges of the contoured section 48, stiffening ribs 38 located along an inside surface of the contoured section, and the bracket 22 located along an outside surface of the contoured section, all interconnected as one monolithic molded piece. The contoured section 48 also includes cutouts 55 aligned and co-located with attachment features 32 of the mounting flanges.

The rear portion 44 of the crossmember may be formed in the same manner as the front portion 42—by first forming the contoured section 48, then overmolding the overmolded portion 52 with any required metal inserts. The overmolding material may be different from, but is preferably compatible with or the same as, the overmolding material of the front overmolded portion 50. The wall thickness is also in the same range as that of the front portion.

FIG. 7 illustrates the rear contoured section 48 and a manner of forming it that is substantially the same as that of the front contoured section. The illustrated rear contoured section 48 includes the same first and second portions 56, 58 and transition region 60 formed from the same exemplary materials and subject to the same non-limiting descriptions associated with the front contoured section 46, although there is no requirement that the front and rear contoured sections must be formed in the same manner or from the same materials. The first portion 56 of the rear contoured section 48 is also associated with the steering or driver side of the vehicle and may therefore include a material composition with enhanced performance, such as via inclusion of carbon or aramid fibers. Neither the composition of the fibers, the average orientation of the fibers, the orientation of fibers relative to an adjacent layer, the diameter of the fibers, the proportion of fibers to polymer matrix, the thickness of each layer, nor the number of layers used to form the rear section 48 is necessarily the same as the front section 46. In an example where one portion of the crossbeam is subjected to a relatively high tensile load during use, a relatively higher percentage of the fibers in that portion can be oriented in alignment with the direction of the tensile load. Where another portion of the crossbeam is subjected to a relatively high compression load during use, a relatively higher number of layers of reinforced material can be used to form that portion to help prevent a buckling failure mode.

After the front and rear portions 42, 44 of the crossmember 10 are formed, including the front and rear contoured sections 46, 48 of the structural beam 18 and the front and rear portions 50, 52 of the overmolding 20, they can be joined together to form the crossmember. These front and rear portions 42, 44 may be joined together by any suitable means, such as by welding, adhesive attachment, threaded fasteners, and various combinations thereof. In one embodiment, the crossmember 10 includes one or more weld joints that attach the crossmember portions 42, 44 together.

Figure 8:
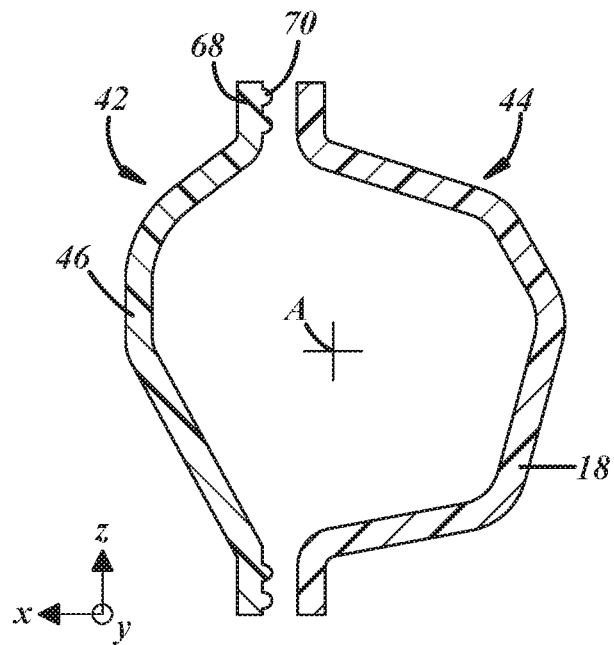
FIG. 8 is a cross-sectional view of the contoured sections of an exemplary crossmember before being joined.
Figure 9:
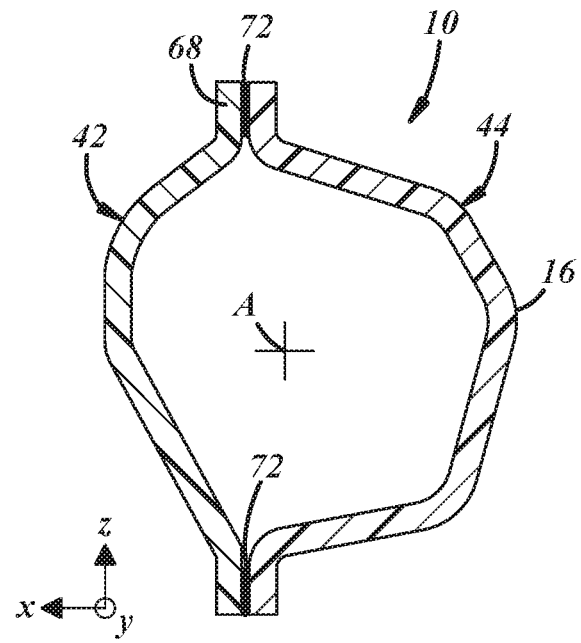
FIG. 9 is a cross-sectional view of the contoured sections of FIG. 8 after being joined.

FIGS. 8 and 9 are cross-sectional views of the crossbar 16 of an exemplary crossmember 10 before and after the crossmember portions 42, 44 are joined. Internal stiffening ribs are omitted for clarity. Upper and lower flanges 68 of one or both halves 42, 44 of the crossmember 10 may include ribs or other protrusions 70 that provide point contact with the opposing half. In this example, the protrusions 70 are provided along flanges 68 of the contoured section 46 of the front portion 42 of the crossbeam 10. Where formed in CFR materials such as that of the contoured sections 46, 48 as described above, the protrusions 70 may be in the form of dimples in the flanges 68. In other embodiments, the protrusions 70 are formed from the overmolding material, such as along the overmolded flanges 54 illustrated in FIGS. 4 and 6. The illustrated protrusions 70 are oriented in the lengthwise (y) direction. In other examples, multiple protrusions may be spaced apart in the lengthwise (y) direction and individually oriented in the radial direction with respect to the central axis A.

The two portions 42, 44 may be brought together with the concave sides of their respective contoured sections 46, 48 facing each other, and the portions 42, 44 can be joined at the flanges 68 via ultrasonic welding or vibration welding. Other types of energy can be used to soften or melt the desired parts of the opposing portions 42, 44 for purposes of plastic welding, such as heat from hot plates or from IR energy. The protrusions 70 soften or melt and are deformed under pressure (e.g., clamp pressure in the x-direction in FIGS. 8 and 9), thereby forming weld joints 72 along the lengthwise direction of the crossmember 10. Other attachment techniques are possible.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle crossmember configured for attachment to transversely opposite sides of a vehicle body, the crossmember comprising:
   a crossbar extending in a lengthwise direction such that the crossbar extends transversely across the vehicle body when attached to the vehicle body, wherein the crossbar is made from fiber-reinforced polymeric material having a plurality of different material compositions along the lengthwise direction, each of the plurality of different material compositions being a fiber-reinforced polymeric material composition having non-randomly oriented fiber reinforcements,
   wherein the plurality of different material compositions includes a first material composition and a second material composition that meet at a transition region of the crossbar, the first material composition being uniform along a first lengthwise portion of the crossbar between a first mounting flange and the transition region and the second material composition being uniform along a different second lengthwise portion of the crossbar between a second mounting flange and the transition region.

2. The vehicle crossmember of claim 1, wherein the plurality of different material compositions includes a third material composition in the transition region.

3. The vehicle crossmember of claim 1, wherein the first mounting flange includes the first material composition and the second mounting flange includes the second material composition.

4. The vehicle crossmember of claim 1, wherein each portion of the crossbar includes lengthwise continuous fiber reinforcements each having an end at the transition region.

5. The vehicle crossmember of claim 1, wherein one of the plurality of different material compositions includes carbon fiber reinforcements and another of the plurality different material compositions is substantially free from carbon fiber reinforcements.

6. The vehicle crossmember of claim 1, wherein each one of the plurality of different material compositions includes a polymer portion and a fiber portion, the polymer portion being the same among the plurality of different material compositions, and the fiber portion being different among the plurality of different material compositions.

7. The vehicle crossmember of claim 1, wherein the crossbar is tubular and extends between the first and second mounting flanges along a central axis such that the fiber-reinforced polymeric material is radially spaced from the central axis between the mounting flanges.

8. The vehicle crossmember of claim 1, wherein the crossbar is formed from two contoured sections with concave sides of the contoured sections facing each other, the contoured sections being attached together along a pair of joints extending along the lengthwise direction.

9. The vehicle crossmember of claim 1, further comprising an overmolding extending along inside and outside surfaces of the crossbar, the overmolding including stiffening ribs and attachment features located and configured to affix the crossmember to the vehicle body.

10. The vehicle crossmember of claim 9, wherein the attachment features are located along the first and second mounting flanges.

11. The vehicle crossmember of claim 9, wherein the overmolding includes a center leg extending away from the crossbar to an end including one of the attachment features.

12. The vehicle crossmember of claim 9, wherein the crossbar is tubular and at least some of the stiffening ribs are located inside the tubular crossbar.

13. The vehicle crossmember of claim 9, further comprising a joint formed from overmolding material and joining one contoured section of the crossbar to another contoured section of the crossbar.

14. The vehicle crossmember of claim 9, wherein the overmolding at least partly covers the transition region of the crossbar where two of the plurality of different material compositions meet.

15. A vehicle crossmember configured for attachment to transversely opposite sides of a vehicle body, the crossmember comprising:
   a crossbar extending in a lengthwise direction such that the crossbar extends transversely across the vehicle body when attached to the vehicle body, wherein the crossbar is made from fiber-reinforced polymeric material comprising non-randomly oriented fibers, and
   wherein the crossbar is formed from two contoured sections with concave sides of the contoured sections facing each other, the contoured sections being attached together along a pair of joints extending along the lengthwise direction,
   wherein the fiber-reinforced polymeric material has a plurality of different material compositions along the lengthwise direction, and
   wherein the plurality of different material compositions includes a first material composition that is uniform in the lengthwise direction, a second material composition that is uniform in the lengthwise direction, and a third material composition in a transition region in which portions of the first material composition overlap with portions of the second material composition.

16. A method of making the vehicle crossmember of claim 15, the method comprising the steps of:
   (a) forming a first of the two contoured sections of the crossbar from multiple layers of fiber-reinforced polymeric sheet material, wherein one end of the first contoured section has a different number of layers or a different type of reinforcement fibers than an opposite end of the first contoured section;
   (b) forming a second of the two contoured sections of the crossbar from multiple layers of fiber-reinforced polymeric sheet material;
   (c) overmolding stiffening ribs or vehicle body attachment points along surfaces of the first and second contoured sections; and
   (d) attaching the overmolded first and second contoured sections together to form the vehicle crossmember, wherein the contoured sections form the crossbar in tubular form with at least some of the stiffening ribs inside the crossbar.

17. The vehicle crossmember of claim 15, wherein the crossbar is tubular and surrounds a central axis to define a hollow portion of the crossbar between the concave sides of the contoured sections.

18. The vehicle crossmember of claim 17, further comprising an overmolding including stiffening ribs located inside the tubular crossbar.

19. The vehicle crossmember of claim 15, wherein the crossbar includes lengthwise continuous fiber reinforcements each having an end at the transition region.

20. The vehicle crossmember of claim 15, wherein one of the plurality of different material compositions includes carbon fiber reinforcements and another of the plurality different material compositions is substantially free from carbon fiber reinforcements.

* * * * *